United States Patent
Shiokawa

(10) Patent No.: US 12,538,713 B2
(45) Date of Patent: Jan. 27, 2026

(54) MAGNETIC RECORDING ARRAY AND RESERVOIR ELEMENT

(71) Applicant: TDK CORPORATION, Tokyo (JP)

(72) Inventor: Yohei Shiokawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 665 days.

(21) Appl. No.: 17/777,452

(22) PCT Filed: Feb. 7, 2020

(86) PCT No.: PCT/JP2020/004893
§ 371 (c)(1),
(2) Date: May 17, 2022

(87) PCT Pub. No.: WO2021/157072
PCT Pub. Date: Aug. 12, 2021

(65) Prior Publication Data
US 2022/0406995 A1  Dec. 22, 2022

(51) Int. Cl.
*H10N 50/10* (2023.01)
*G11C 11/16* (2006.01)
(Continued)

(52) U.S. Cl.
CPC ........... *H10N 50/10* (2023.02); *G11C 11/161* (2013.01); *G11C 11/1673* (2013.01);
(Continued)

(58) Field of Classification Search
CPC ........ H10N 50/10; H10D 48/40; G11C 11/18; G11C 11/161; G11C 11/1673–1697
See application file for complete search history.

(56) References Cited

U.S. PATENT DOCUMENTS 6,349,054 B1 * 2/2002 Hidaka ............... G11C 11/1653
                                                         365/171
8,350,347 B2  1/2013 Gaudin et al.
(Continued)

FOREIGN PATENT DOCUMENTS

JP  2008-192711 A  8/2008
JP  2014-045196 A  3/2014
(Continued)

OTHER PUBLICATIONS

Wikipedia article on resistivity and conductivity (Year: 2018): https://en.wikipedia.org/w/index.php?title=Electrical_resistivity_and_conductivity&oldid=842699784.*
(Continued)

*Primary Examiner* — Britt D Hanley
*Assistant Examiner* — Jason James Greaving
(74) *Attorney, Agent, or Firm* — Oliff PLC

(57) ABSTRACT

A magnetic recording array includes a plurality of spin elements arranged in a matrix, each spin element including a wiring and a stacked body that includes a first ferromagnetic layer stacked on the wiring, a plurality of write wirings connected to first ends of the respective wirings in the plurality of spin elements, a plurality of read wirings connected to the respective stacked bodies in the plurality of spin elements, and a plurality of common wirings connected to second ends of the wirings in the respective spin elements belonging to the same row, wherein the common wiring has an electrical resistance lower than the electrical resistance of the write wiring or the read wiring.

14 Claims, 6 Drawing Sheets

(51) Int. Cl.
  *H10B 61/00* (2023.01)
  *H10N 50/80* (2023.01)
  *H10N 50/85* (2023.01)

(52) U.S. Cl.
  CPC .......... *G11C 11/1675* (2013.01); *H10B 61/00* (2023.02); *H10N 50/80* (2023.02); *H10N 50/85* (2023.02)

(56) References Cited

U.S. PATENT DOCUMENTS

| | | | |
|---|---|---|---|
| 2002/0057593 A1* | 5/2002 | Hidaka | G11C 5/025 365/171 |
| 2003/0156448 A1* | 8/2003 | Hidaka | G11C 8/08 365/171 |
| 2011/0129691 A1 | 6/2011 | Ishiwata et al. | |
| 2013/0223173 A1 | 8/2013 | Higashi et al. | |
| 2014/0056060 A1 | 2/2014 | Khvalkovskiy et al. | |
| 2014/0252439 A1 | 9/2014 | Guo | |
| 2014/0312441 A1 | 10/2014 | Guo | |
| 2015/0036415 A1 | 2/2015 | Di Pendina et al. | |
| 2015/0348606 A1 | 12/2015 | Buhrman et al. | |
| 2016/0020207 A1 | 1/2016 | Tsuchiya et al. | |
| 2017/0077177 A1* | 3/2017 | Shimomura | G11C 11/18 |
| 2017/0178705 A1 | 6/2017 | Buhrman et al. | |
| 2017/0222135 A1 | 8/2017 | Fukami et al. | |
| 2018/0040358 A1 | 2/2018 | Noguchi et al. | |
| 2019/0348329 A1 | 11/2019 | Shiokawa et al. | |
| 2021/0364580 A1 | 11/2021 | Tsumita et al. | |
| 2022/0029089 A1 | 1/2022 | Sasaki et al. | |

FOREIGN PATENT DOCUMENTS

| | | |
|---|---|---|
| JP | 5441005 B2 | 3/2014 |
| JP | 5624573 B2 | 11/2014 |
| JP | 2016-021530 A | 2/2016 |
| JP | 2017-216286 A | 12/2017 |
| JP | 6271655 B1 | 1/2018 |
| JP | 2019-110326 A | 7/2019 |
| JP | 6610839 B1 | 11/2019 |
| WO | 2016/021468 A1 | 2/2016 |
| WO | 2016/159017 A1 | 10/2016 |
| WO | 2019/171715 A1 | 9/2019 |

OTHER PUBLICATIONS

Apr. 14, 2020 International Search Report issued in International Patent Application No. PCT/JP2020/004893.

Y.K. Kato, et al., "Observation of the Spin Hall Effect in Semiconductors," Science 306, 1910, 2004.

Miron et al., "Perpendicular switching of a single ferromagnetic layer induced by in-plane current injection," Nature, vol. 476, pp. 189-194, Aug. 11, 2011.

Liu et al., "Spin torque switching with the giant spin Hall effect of tantalum," Science, 336, 555, Mar. 13, 2012.

Liu et al., "Current-Induced Switching of Perpendicularly Magnetized Magnetic Layers Using Spin Torque from the Spin Hall Effect," American Physical Society, Physical Review Letters, 109, 096602, Aug. 31, 2012.

Lee et al., "Threshold current for switching of a perpendicular magnetic layer induced by spin Hall effect," American Institute of Physics, Applied Physics Letters, 102, 112410, 2013.

Lee et al., "Thermally activated switching of perpendicular magnet by spin-orbit spin torque," American Institute of Physics, Applied Physics Letters, 104, 072413, 2014.

Fukami et al., "Magnetization switching by spin-orbit torque in an antiferromagnet-ferromagnet bilayer system," Nature materials, vol. 15, pp. 535-542, May 2016.

Fukami et al., "A spin-orbit torque switching scheme with collinear magnetic easy axis and current configuration," Nature nanotechnology, 11, 621, Mar. 21, 2016.

Takahashi et al., "Spin injection and detection in magnetic nanostructures," Institute for Materials Research, Tohoku University, Physical Review B 67, 052409, Feb. 28, 2003.

Seo et al., "Area-Efficient SOT-MRAM With a Schottky Diode," IEEE Electron Device Letters, vol. 37, No. 8, pp. 982-985, Aug. 2016.

Zhang et al., "Spin Hall Effects in Metallic Antiferromagnets," Physical Review Letters, 113, 196602, Nov. 7, 2014.

* cited by examiner

MAGNETIC RECORDING ARRAY AND RESERVOIR ELEMENT

TECHNICAL FIELD

The present invention relates to a magnetic recording array and a reservoir element.

BACKGROUND ART

The next-generation non-volatile memory is attracting attention as an alternative to a flash memory and the like of which miniaturization has reached the limit. For example, a magnetoresistive random access memory (MRAM), a resistance random access memory (ReRAM), a phase change random access memory (PCRAM), and the like are known as the next-generation non-volatile memories.

The MRAM is a memory element using a magnetoresistance effect element. The resistance value of the magnetoresistance effect element changes depending on a difference in the relative angle of magnetization directions between two magnetic films. The MRAM records the resistance value of the magnetoresistance effect element as data.

Among spin elements using the change in magnetic resistance, a spin-orbit torque type magnetoresistance effect element (for example, Patent Document 1) using the spin-orbit torque (SOT) and a domain wall moving type magnetic recording element using the movement of a domain wall (for example, Patent Document 2) are attracting attention. Such spin elements are connected to a semiconductor element such as a transistor by wiring and controlled. For example, Patent Document 3 discloses that the electromigration resistance of a wiring is enhanced by forming a barrier metal film on the wiring in a semiconductor device.

CITATION LIST

Patent Documents

[Patent Document 1] Japanese Unexamined Patent Application, First Publication No. 2017-216286
[Patent Document 2] Japanese Patent No. 5441005
[Patent Document 3] Japanese Unexamined Patent Application, First Publication No. 2016-21530

SUMMARY OF INVENTION

Technical Problem

In a magnetic recording array in which a plurality of spin elements are arranged in a matrix or a reservoir element using the magnetic recording array, the write operation and the read operation of the spin element are performed with a combination of three wirings being a write wiring, a read wiring, and a common wiring. In this case, the common wiring functions as a wiring used for both the write operation and the read operation of the spin element. Thus, the common wiring most easily deteriorates.

The present invention has been made in view of the above problems, and an object of the present invention is to provide a magnetic recording array and a reservoir element in which a common wiring is less likely to deteriorate.

Solution to Problem

To solve the above problems, the present invention provides the following means.

(1) A magnetic recording array includes a plurality of spin elements arranged in a matrix, each spin element including a wiring and a stacked body that includes a first ferromagnetic layer stacked on the wiring, a plurality of write wirings connected to first ends of the respective wirings in the plurality of spin elements, a plurality of read wirings connected to the respective stacked bodies in the plurality of spin elements, and a plurality of common wirings connected to second ends of the wirings in the respective spin elements belonging to the same column. The common wiring has an electrical resistance lower than the electrical resistance of the write wiring or the read wiring.

(2) In the magnetic recording array described in (1), the common wiring has the electrical resistance lower than the electrical resistances of the write wiring and the read wiring, and the write wiring has the electrical resistance lower than the electrical resistance of the read wiring.

(3) In the magnetic recording array described in (1), the common wiring has the electrical resistance lower than the electrical resistances of the write wiring and the read wiring, and the read wiring has the electrical resistance lower than the electrical resistance of the write wiring.

(4) In the magnetic recording array described in (1), a cross-sectional area of the common wiring with respect to a current application direction is larger than a cross-sectional area of the write wiring or the read wiring with respect to a current application direction.

(5) In the magnetic recording array described in (4), the cross-sectional area of the common wiring with respect to the current application direction is larger than the cross-sectional areas of the write wiring and the read wiring with respect to the current application direction, and the cross-sectional area of the write wiring with respect to the current application direction is larger than the cross-sectional area of the read wiring with respect to a current application direction.

(6) In the magnetic recording array described in (4), the cross-sectional area of the common wiring with respect to the current application direction is larger than the cross-sectional areas of the write wiring and the read wiring with respect to the current application direction, and the cross-sectional area of the read wiring with respect to the current application direction is larger than the cross-sectional area of the write wiring with respect to the current application direction.

(7) In the magnetic recording array described in (1), the common wiring has an electrical resistivity lower than the electrical resistivity of the write wiring or the read wiring.

(8) In the magnetic recording array described in (7), the common wiring has the electrical resistivity lower than the electrical resistivities of the write wiring and the read wiring, and the write wiring has the electrical resistivity lower than the electrical resistivity of the read wiring.

(9) In the magnetic recording array described in (7), the common wiring has the electrical resistivity lower than the electrical resistivities of the write wiring and the read wiring, and the read wiring has the electrical resistivity lower than the electrical resistivity of the write wiring.

(10) A magnetic recording array includes a plurality of spin elements arranged in a matrix, each spin element including a wiring and a stacked body that includes a first ferromagnetic layer stacked on the wiring, a plurality of write wirings connected to first ends of the respective wirings in the plurality of spin elements, a plurality of read wirings connected to the respective stacked bodies in the plurality of spin elements, and a plurality of common wirings connected to second ends of the wirings in the respective spin elements belonging to the same column. The common wiring has an activation energy higher than an activation energy of the write wiring or the read wiring.

(11) In the magnetic recording array described in (10), the activation energy of the common wiring is higher than the activation energies of the write wiring and the read wiring, and the activation energy of the write wiring is higher than the activation energy of the read wiring.

(12) In the magnetic recording array described in (10), the activation energy of the common wiring is higher than the activation energies of the write wiring and the read wiring, and the activation energy of the read wiring is higher than the activation energy of the write wiring.

(13) In the magnetic recording array described in any one of (10) to (12), the common wiring contains a material having activation energy of 300 kJ/mol or more.

(14) In the magnetic recording array described in any one of (10) to (13), the common wiring contains at least one metal selected from the group consisting of Si, Ti, Cr, Ta, W, and Ir.

(15) In the magnetic recording array described in any one of (1) to (14), the write wiring extends in one direction, the read wiring extends in a direction different from the one direction, and the common wiring extends in a direction different from an extension direction of the write wiring and an extension direction of the read wiring.

(16) In the magnetic recording array described in any one of (1) to (15), the wiring of the spin element is connected to the common wiring via a control element.

(17) In the magnetic recording array described in any one of (1) to (16), the wiring is made of any one of the group consisting of metal, an alloy, an intermetallic compound, a metal boride, a metal carbide, a metal silicide, and a metal phosphate having a function of generating a spin current by a spin Hall effect when a current flows.

(18) In the magnetic recording array described in any one of (1) to (17), the stacked body includes a non-magnetic layer and the first ferromagnetic layer from a side close to the wiring, and the wiring is a ferromagnetic layer enabled to have a domain wall inside.

(19) A reservoir element includes the magnetic recording array described in any one of (1) to (18) and a spin conduction layer that connects the first ferromagnetic layers of the plurality of spin elements to each other.

Advantageous Effects of Invention

According to the present invention, it is possible to provide a magnetic recording array and a reservoir element in which a common wiring is less likely to deteriorate.

DESCRIPTION OF EMBODIMENTS

Figure 1:
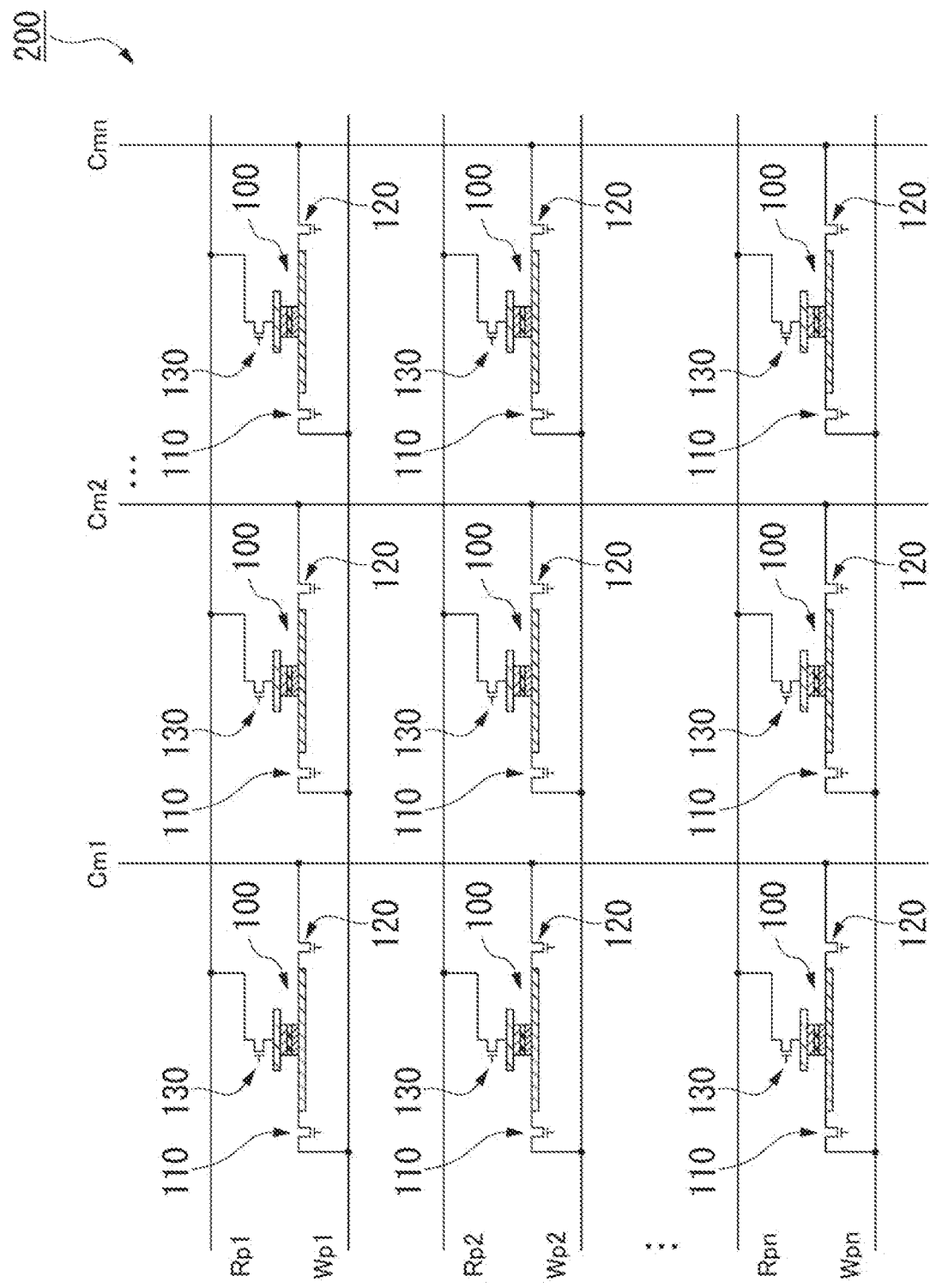
FIG. 1 is a schematic diagram of a magnetic recording array according to a first embodiment.

Hereinafter, the present embodiment will be described in detail with reference to the drawings as appropriate. The drawing used in the following description may be enlarged for convenience in order to make the features of the present invention easy to understand, and the dimensional ratios and the like of each component may differ from the actual ones. The materials, the dimensions, and the like in the following description are exemplary examples, and the present invention is not limited thereto. The present invention can be appropriately changed and carried out within a range in which the effects of the present invention are exhibited.

First, directions are defined. One direction of one surface of a substrate Sub (see FIG. 3) described later is defined as an x-direction, and a direction perpendicular to the x-direction is defined as a y-direction. The x-direction is a direction in which a wiring 20 described later extends, and is a length direction of the wiring 20. The x-direction is an example of a first direction. The y-direction is an example of a second direction. A z-direction is a direction perpendicular to the x-direction and the y-direction. The z-direction is an example of a stacking direction. The +z direction may be expressed as "up" below and the −z direction may be expressed as "down" below. The up and down direction do not necessarily coincide with a direction in which the gravity is applied.

In the present specification, "extending in the x-direction" means, for example, that the dimension in the x-direction is larger than the smallest dimension among the dimensions in the x-direction, the y-direction, and the z-direction. This is similarly applied to cases of extending in other directions.

First Embodiment

FIG. 1 is a configuration diagram of a magnetic recording array 200 according to a first embodiment. A magnetic recording array 200 includes a plurality of magnetoresistance effect elements 100, a plurality of write wirings $Wp_1$ to $Wp_n$, a plurality of common wirings $Cm_1$ to $Cm_n$, a plurality of read wirings $Rp_1$ to $Rp_n$, a plurality of first switching elements 110, a plurality of second switching elements 120, and a plurality of third switching elements 130. The magnetic recording array 200 can be used for, for example, a magnetic memory. The magnetoresistance effect element 100 is an example of a spin element.

The plurality of magnetoresistance effect elements 100 represented in FIG. 1 are arranged in a matrix of n rows and m columns. n and m are any integers. Here, the "matrix" is not limited to a case where the actual elements are arranged in a matrix, but includes a case where the actual elements are illustrated in a matrix in the circuit diagram.

The write wirings $Wp_1$ to $Wp_n$ are wirings connected to first ends of wirings described later in the magnetoresistance effect element 100. The write wirings $Wp_1$ to $Wp_n$ are used, for example, at time of writing data. There are n write wirings $Wp_1$ to $Wp_n$ represented in FIG. 1. The write wirings $Wp_1$ to $Wp_n$ electrically connect a power source (not represented) and one or more magnetoresistance effect elements 100. The write wirings $Wp_1$ to $Wp_n$ represented in FIG. 1 electrically connect the magnetoresistance effect elements 100 belonging to the same row to the power source (not represented). The write wirings $Wp_1$ to $Wp_n$ may be individually connected to the respective magnetoresistance effect elements 100, or may be connected to the magnetoresistance effect elements 100 belonging to the same column.

The read wirings $Rp_1$ to $Rp_n$ are wirings connected to a stacked body (described later) of the magnetoresistance effect element 100. The read wirings $Rp_1$ to $Rp_n$ are, for example, wirings used at time of reading data. There are n read wirings $Rp_1$ to $Rp_n$ represented in FIG. 1. The read wirings $Rp_1$ to $Rp_n$ electrically connect one or more magnetoresistance effect elements 100 to the power source (not represented). The read wirings $Rp_1$ to $Rp_n$ represented in FIG. 1 electrically connect the magnetoresistance effect element 100 belonging to the same row to the power source (not represented). The read wirings $Rp_1$ to $Rp_n$ may be individually connected to the respective magnetoresistance effect elements 100, or may be connected to the magnetoresistance effect elements 100 belonging to the same column.

The common wirings $Cm_1$ to $Cm_n$ are wirings connected to second ends of the wirings described later in the magnetoresistance effect element 100. The common wirings $Cm_1$ to $Cm_n$ are wirings used at both time of writing data and time of reading data, for example. There are n common wirings $Cm_1$ to $Cm_n$ represented in FIG. 1. The common wirings $Cm_1$ to $Cm_n$ electrically connect the magnetoresistance effect element 100 belonging to the same column to a reference potential. The reference potential is, for example, the ground.

The common wirings $Cm_1$ to $Cm_m$ are configured to, for example, have an electrical resistance that is lower than the electrical resistances of the write wirings $Wp_1$ to $Wp_n$ or the read wirings $Rp_1$ to $Rp_n$. The common wirings $Cm_1$ to $Cm_m$ preferably have an electrical resistance lower than the electrical resistances of the write wirings $Wp_1$ to $Wp_n$ and the read wirings $Rp_1$ to $Rp_n$. The common wirings $Cm_1$ to $Cm_m$ preferably have an electrical resistance lower than the electrical resistances of the write wirings $Wp_1$ to $Wp_n$ and the read wirings $Rp_1$ to $Rp_n$ by 80% or more, and more preferably 50% or more. The electrical resistances of the write wirings $Wp_1$ to $Wp_n$ may be equal to the electrical resistances of the read wirings $Rp_1$ to $Rp_n$. The electrical resistances of the write wirings $Wp_1$ to $Wp_n$ may be lower than the electrical resistances of the read wirings $Rp_1$ to $Rp_n$. The electrical resistances of the read wirings $Rp_1$ to $Rp_n$ may be lower than the electrical resistances of the write wirings $Wp_1$ to $Wp_n$.

The electrical resistances of the common wirings $Cm_1$ to $Cm_m$, the write wirings $Wp_1$ to $Wp_n$, and the read wirings $Rp_1$ to $Rp_n$ can be adjusted, for example, by the cross-sectional area with respect to a current application direction and the electrical resistivity. The common wirings $Cm_1$ to $Cm_m$ preferably have a cross-sectional area with respect to the current application direction larger than cross-sectional areas of the write wirings $Wp_1$ to $Wp_n$ or the read wirings $Rp_1$ to $Rp_n$. The common wirings $Cm_1$ to $Cm_m$ more preferably have a cross-sectional area with respect to the current application direction larger than the cross-sectional areas of the write wirings $Wp_1$ to $Wp_n$ and the read wirings $Rp_1$ to $Rp_n$. The common wirings $Cm_1$ to $Cm_m$ preferably have a cross-sectional area with respect to the current application direction larger than the cross-sectional areas of the write wirings $Wp_1$ to $Wp_n$ and the read wirings $Rp_1$ to $Rp_n$ by 25% or more and more preferably by 100% or more. The cross-sectional areas of the write wirings $Wp_1$ to $Wp_n$ with respect to the current application direction may be equal to the cross-sectional areas of the read wirings $Rp_1$ to $Rp_n$ with respect to the current application direction. The cross-sectional areas of the write wirings $Wp_1$ to $Wp_n$ may be larger than the cross-sectional areas of the read wirings $Rp_1$ to $Rp_n$. The cross-sectional areas of the read wirings $Rp_1$ to $Rp_n$ may be larger than the cross-sectional areas of the write wirings $Wp_1$ to $Wp_n$.

The common wirings $Cm_1$ to $Cm_m$ preferably have an electrical resistivity lower than electrical resistivities of the write wirings $Wp_1$ to $Wp_n$ or the read wirings $Rp_1$ to $Rp_n$. The electrical resistivities of the common wirings $Cm_1$ to $Cm_m$ are more preferably lower than the electrical resistivities of the write wirings $Wp_1$ to $Wp_n$ and the read wirings $Rp_1$ to $Rp_n$. The common wirings $Cm_1$ to $Cm_m$ preferably have an electrical resistivity lower than the electrical resistivities of the write wirings $Wp_1$ to $Wp_n$ and the read wirings $Rp_1$ to $Rp_n$ by 80% or more, and more preferably 50% or more. The electrical resistivities of the write wirings $Wp_1$ to $Wp_n$ may be equal to the electrical resistivities of the read wirings $Rp_1$ to $Rp_n$. The electrical resistivities of the write wirings $Wp_1$ to $Wp_n$ may be lower than the electrical resistivities of read wirings $Rp_1$ to $Rp_n$. The electrical resistivities of the read wirings $Rp_1$ to $Rp_n$ may be lower than the electrical resistivities of the write wirings $Wp_1$ to $Wp_n$.

Further, the common wirings $Cm_1$ to $Cm_m$ are configured to have an activation energy that is higher than, for example, activation energies of the write wirings $Wp_1$ to $Wp_n$ or the read wirings $Rp_1$ to $Rp_n$. The activation energies of the common wirings $Cm_1$ to $Cm_m$ are preferably higher than the activation energies of the write wirings $Wp_1$ to $Wp_n$ and the read wirings $Rp_1$ to $Rp_n$. The activation energies of the common wirings $Cm_1$ to $Cm_m$ are higher than the activation energies of the write wirings $Wp_1$ to $Wp_n$ and the read wirings $Rp_1$ to $Rp_n$, by preferably 50% or more and by more preferably 100% or more. The activation energies of the write wirings $Wp_1$ to $Wp_n$ may be equal to the activation energies of the read wirings $Rp_1$ to $Rp_n$. The activation energies of the write wirings $Wp_1$ to $Wp_n$ may be higher than the activation energies of the read wirings $Rp_1$ to $Rp_n$. The activation energies of the read wirings $Rp_1$ to $Rp_n$ may be higher than the activation energies of the write wirings $Wp_1$ to $Wp_n$.

The activation energies of the common wirings $Cm_1$ to $Cm_m$ can be adjusted from the material forming the common wirings $Cm_1$ to $Cm_m$. The common wirings $Cm_1$ to $Cm_m$ preferably contain a material having an activation energy of 300 kJ/mol or more. The common wirings $Cm_1$ to $Cm_m$ preferably contain at least one metal selected from the group consisting of Si, Ti, Cr, Ta, W, and Ir. The common wirings $Cm_1$ to $Cm_m$ may be the above-described metal alone, a stacked structure of the above-described metal and another conductive metal, or an alloy containing the above-described metal. In the case of an alloy, the above metal is preferably contained in a range of 10% or more and 80% or less with respect to a base material. As the base material for the common wirings $Cm_1$ to $Cm_m$, for example, conductive metal such as Cu, Ag, or Au can be used. The conductive metal can be used as the materials of the write wirings $Wp_1$ to $Wp_n$ and the read wirings $Rp_1$ to $Rp_n$.

The first switching element 110, the second switching element 120, and the third switching element 130 are connected to each of the plurality of magnetoresistance effect elements 100. The first switching elements 110 are connected between the magnetoresistance effect elements 100 and the write wirings $Wp_1$ to $Wp_n$, respectively. The second switching elements 120 are connected between the magnetoresistance effect elements 100 and the common wirings $Cm_1$ to $Cm_n$, respectively. The third switching elements 130 are connected between the magnetoresistance effect elements 100 and the read wiring $Rp_1$ to $Rp_n$, respectively.

When the first switching element 110 and the second switching element 120 are turned ON, a write current flows between the write wiring $Wp_1$ to $Wp_n$ and the common wiring $Cm_1$ to $Cm_n$, which are connected to the predetermined magnetoresistance effect element 100. When the second switching element 120 and the third switching element 130 are turned ON, a read current flows between the common wiring $Cm_1$ to $Cm_n$ and the read wiring $Rp_1$ to $Rp_n$, which are connected to the predetermined magnetoresistance effect element 100.

The first switching element 110, the second switching element 120, and the third switching element 130 are control elements that control the flow of the current. The first switching element 110, the second switching element 120, and the third switching element 130 are, for example, a transistor, an element such as an Ovonic Threshold Switch (OTS), which uses a phase change of a crystal layer, an element such as a metal-insulator transition (MIT) switch, which uses a change in a band structure, an element such as a Zener diode and an avalanche diode, which uses a breakdown voltage, and an element having conductivity that changes with a change of an atomic position.

Figure 2:
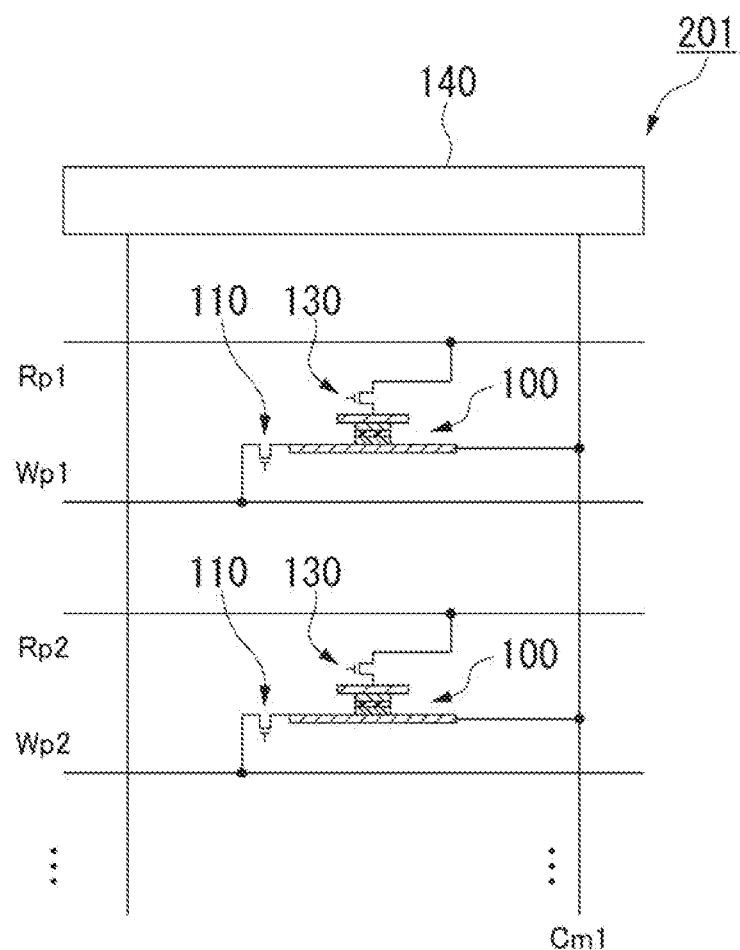
FIG. 2 is a schematic diagram of an example of the magnetic recording array according to the first embodiment.

Any one of the first switching element 110, the second switching element 120, and the third switching element 130 may be shared by the magnetoresistance effect element 100 connected to the same wiring. For example, when the first switching element 110 is intended to be shared, one first switching element 110 is provided on an upstream side of the write wirings $Wp_1$ to $Wp_n$. For example, when the second switching element 120 is intended to be shared, one second switching element 120 is provided on an upstream side of the common wirings $Cm_1$ to $Cm_n$. For example, when the third switching element 130 is intended to be shared, one third switching element 130 is provided on an upstream side of the read wirings $Rp_1$ to $Rp_n$. FIG. 2 represents an example of a magnetic recording array 201 sharing the second switching element 120. In the magnetic recording array 201 represented in FIG. 2, the common wiring $Cm_1$ connected to the magnetoresistance effect elements 100 belonging to the same column is joined to one shared switching element 140, and the magnetoresistance effect elements 100 belonging to the same column share the shared switching element 140.

Here, the electrical resistance of each wiring will be described. The electrical resistances of the write wirings $Wp_1$ to $Wp_n$, the read wirings $Rp_1$ to $Rp_n$, and the common wirings $Cm_1$ to $Cm_m$ are the resistance between the magnetoresistance effect element 100 and the switching element. For example, in the case of the magnetic recording array 200 represented in FIG. 1, the electrical resistances of the write wirings $Wp_1$ to $Wp_n$ are the electrical resistance between the magnetoresistance effect element 100 and the first switching element 110. The electrical resistances of the read wirings $Rp_1$ to $Rp_n$ are the electrical resistance between the magnetoresistance effect element 100 and the third switching element 130. The electrical resistances of the common wiring $Cm_1$ to $Cm_m$ are the electrical resistance between the magnetoresistance effect element 100 and the second switching element 120. In the case of the magnetic recording array 201 represented in FIG. 2, the electrical resistance of the common wiring $Cm_1$ is the electrical resistance between the respective magnetoresistance effect elements 100 and the shared switching element 140.

Figure 3:
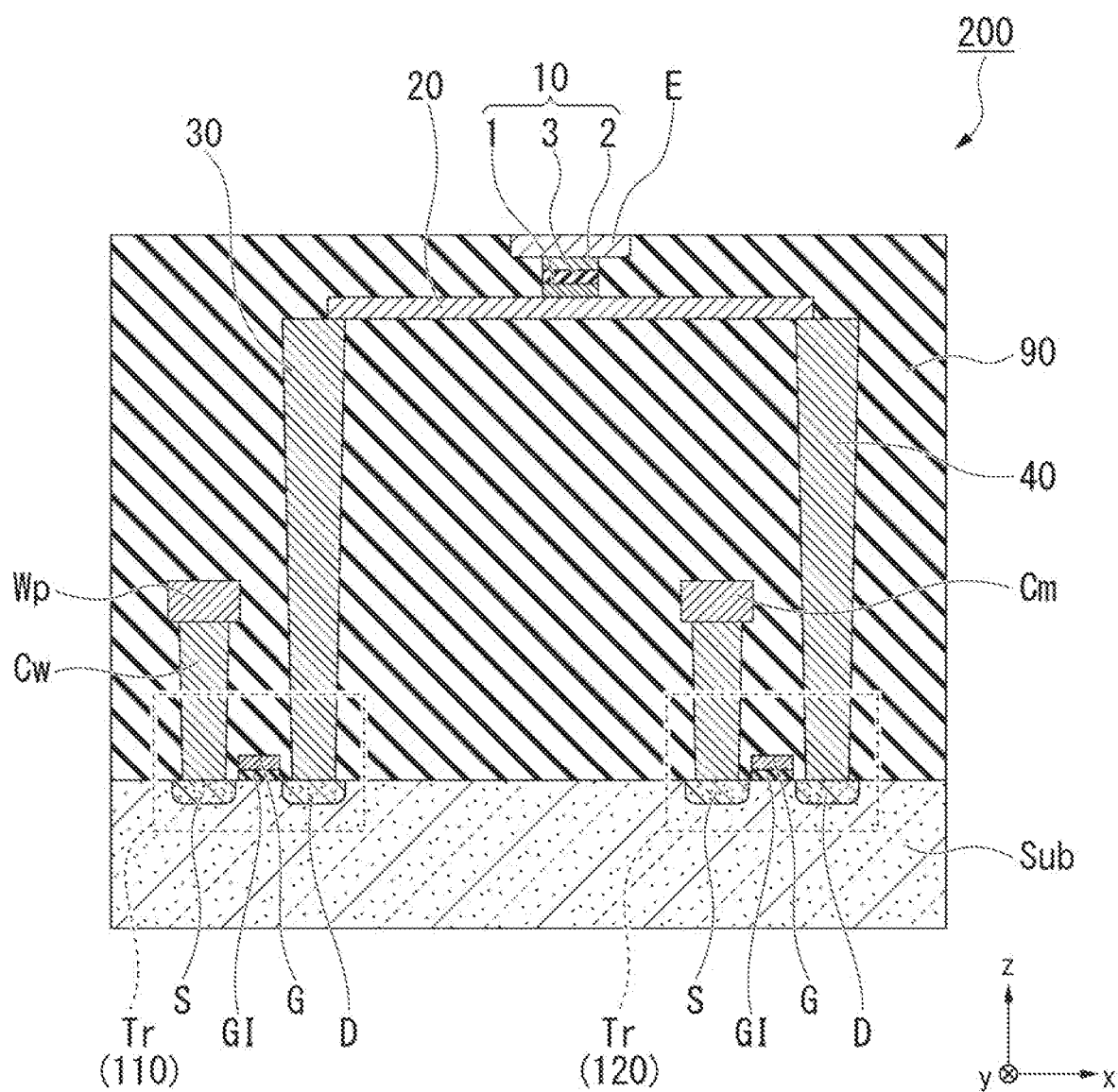
FIG. 3 is a cross-sectional view of a characteristic portion of the magnetic recording array according to the first embodiment.

FIG. 3 is a cross-sectional view of a main portion of the magnetic recording array 200 according to the first embodiment. FIG. 3 represents a cross section obtained by cutting the magnetoresistance effect element 100 along an xz plane passing through the center of the width of the wiring 20 (described later) in the y-direction.

The first switching element 110 and the second switching element 120 represented in FIG. 3 are transistors Tr. The third switching element 130 is electrically connected to a conductive layer E and is located, for example, in the y-direction in FIG. 3. The transistor Tr is, for example, a field effect transistor, and has a gate electrode G, a gate insulating film GI, a source S, and a drain D. The source S and the drain D are formed at the substrate Sub. The substrate Sub is, for example, a semiconductor substrate.

The transistor Tr and the magnetoresistance effect element 100 are electrically connected to each other via a first conductive portion 30 or a second conductive portion 40. The transistor Tr is connected to the write wiring Wp or the common wiring Cm by a conductive portion Cw. The first conductive portion 30, the second conductive portion 40, and the conductive portion Cw may be referred to as, for example, connection wirings or via wirings. The first conductive portion 30, the second conductive portion 40, and the conductive portion Cw extend in the z-direction, for example.

The periphery of the magnetoresistance effect element 100 and the transistor Tr is covered with an insulating layer 90. The insulating layer 90 is an insulating layer that performs insulating between the wirings of a multilayer wiring and between the elements. The insulating layer 90 is made of, for example, silicon oxide ($SiO_x$), silicon nitride ($SiN_x$), silicon carbide (SiC), chromium nitride, silicon carbonitride (SiCN), silicon oxynitride (SiON), aluminum oxide ($Al_2O_3$), zirconium oxide ($ZrO_x$), and the like.

Figure 4:
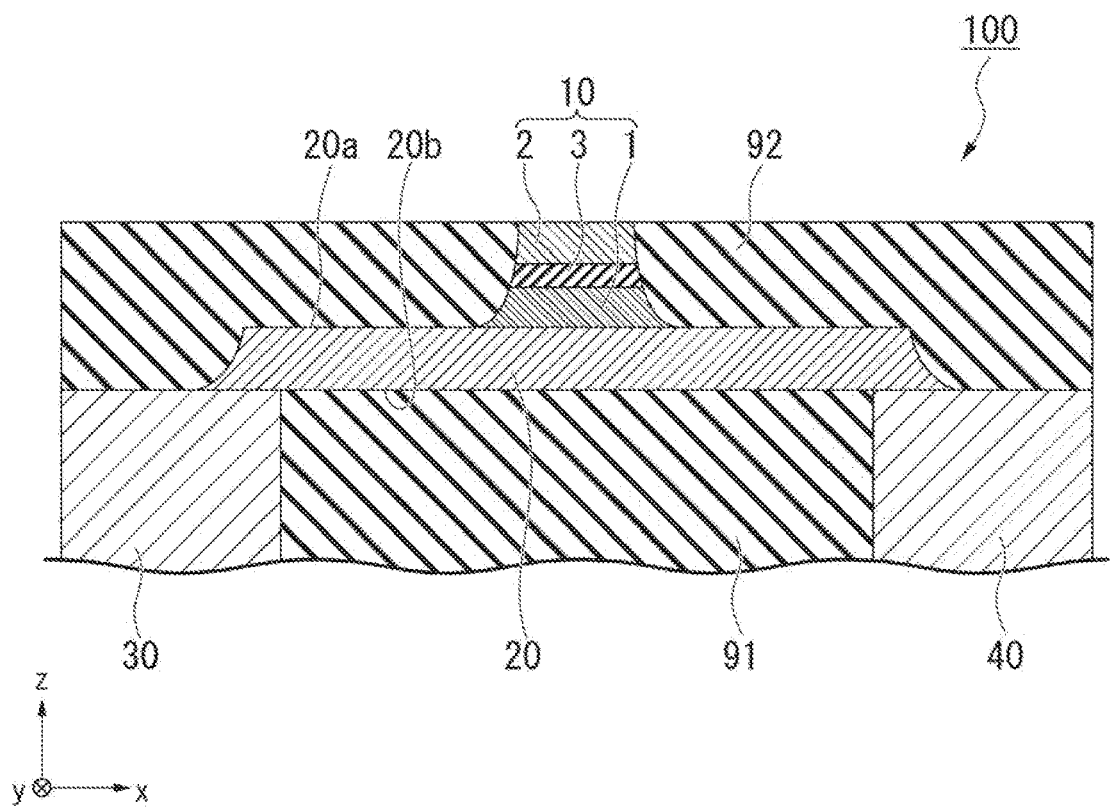
FIG. 4 is a cross-sectional view of a spin element according to the first embodiment.
Figure 5:
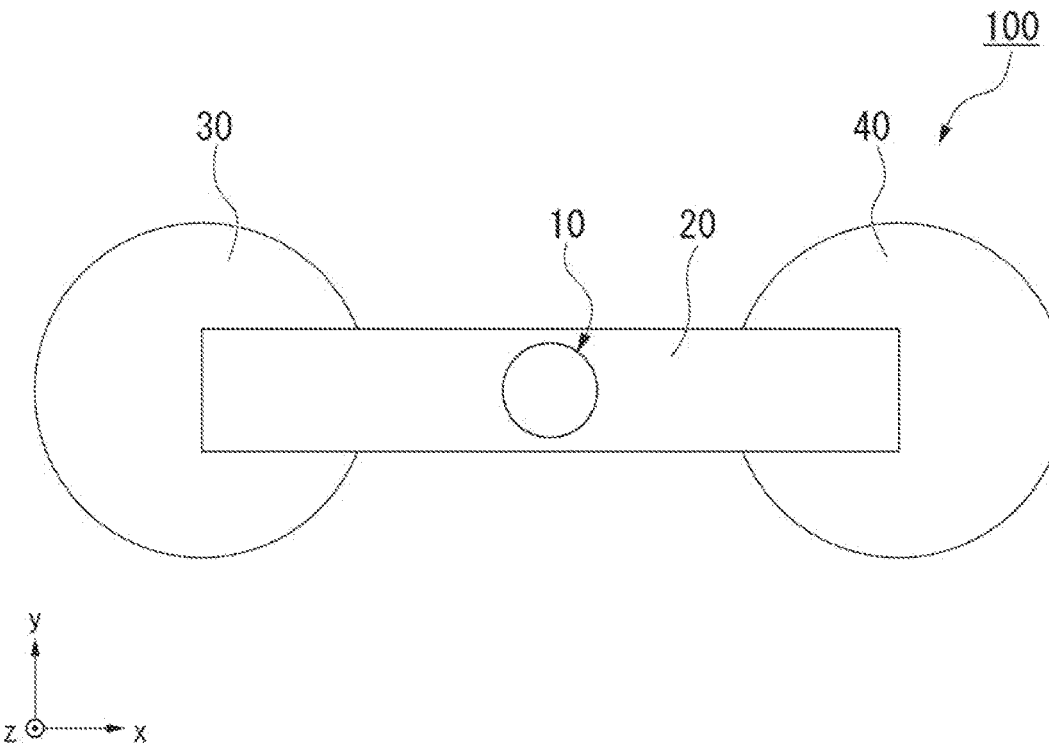
FIG. 5 is a plan view of the spin element according to the first embodiment.

FIG. 4 is a cross-sectional view of the magnetoresistance effect element 100 according to the first embodiment. FIG. 5 is a plan view of the magnetoresistance effect element 100 according to the first embodiment. FIG. 4 represents a cross section obtained by cutting the magnetoresistance effect element 100 along the xz plane passing through the center of the width of the wiring 20 in the y-direction.

The magnetoresistance effect element 100 includes a stacked body 10 and a wiring 20. Insulating layers 91 and 92 are a portion of the insulating layer 90. The resistance value of the stacked body 10 in the z-direction changes as the spin is injected from the wiring 20 into the stacked body 10. The magnetoresistance effect element 100 is a spin element using the spin-orbit torque (SOT), and may be referred to as a spin-orbit torque type magnetoresistance effect element, a spin injection type magnetoresistance effect element, or a spin current magnetoresistance effect element. The wiring 20 may be referred to as a spin-orbit torque wiring.

The stacked body 10 is stacked on the wiring 20. Another layer may be provided between the stacked body 10 and the wiring 20. The stacked body 10 is sandwiched between the wiring 20 and the conductive layer E in the z-direction. The stacked body 10 is electrically connected to the read wiring. The stacked body 10 is a columnar body. The plan view shape of the stacked body 10 from the z-direction is, for example, a circle, an ellipse, or a quadrangle.

The stacked body 10 includes a first ferromagnetic layer 1, a second ferromagnetic layer 2, and a non-magnetic layer 3. The first ferromagnetic layer 1 is in contact with the wiring 20 and is stacked on the wiring 20, for example. Spin is injected into the first ferromagnetic layer 1 from the wiring 20. The magnetization of the first ferromagnetic layer 1 receives spin-orbit torque (SOT) due to the injected spin, and the orientation direction changes. The second ferromagnetic layer 2 is in the z-direction of the first ferromagnetic layer 1. The first ferromagnetic layer 1 and the second ferromagnetic layer 2 sandwich the non-magnetic layer 3 in the z-direction.

Each of the first ferromagnetic layer 1 and the second ferromagnetic layer 2 has magnetism. The magnetization of the second ferromagnetic layer 2 is less likely to change in the orientation direction than the magnetization of the first ferromagnetic layer 1 when a predetermined external force is applied. The first ferromagnetic layer 1 may be referred to as a magnetization free layer, and the second ferromagnetic layer 2 may be referred to as a magnetization fixed layer or a magnetization reference layer. The resistance value of the stacked body 10 changes in accordance with the difference in the relative angle of magnetization between the first ferromagnetic layer 1 and the second ferromagnetic layer 2 sandwiching the non-magnetic layer 3.

The first ferromagnetic layer 1 and the second ferromagnetic layer 2 contain a ferromagnetic material. For example, as the ferromagnetic material, metal selected from the group consisting of Cr, Mn, Co, Fe, and Ni, an alloy including one or more of the above kinds of metal, an alloy including the above kinds of metal and an element of at least one or more kinds of B, C, and N, and the like are provided. As the ferromagnetic material, for example, Co—Fe, Co—Fe—B, Ni—Fe, a Co—Ho alloy, a Sm—Fe alloy, a Fe—Pt alloy, a Co—Pt alloy, and a CoCrPt alloy are provided.

The first ferromagnetic layer 1 and the second ferromagnetic layer 2 may contain a Heusler alloy. The Heusler alloy includes intermetallic compounds having a chemical composition of XYZ or $X_2YZ$. X is a transition metal element or noble metal element of Group Co, Fe, Ni, or Cu on the periodic table. Y is transition metal of Group Mn, V, Cr, or Ti or an elemental species of X. Z is a typical element of Group III to Group V. As the Heusler alloy, for example, $Co_2FeSi$, $Co_2FeGe$, $Co_2FeGa$, $Co_2MnSi$, $Co_2Mn_{1-a}Fe_aAl_bSi_{1-b}$, $Co_2FeGe_{1-c}Ga_c$, and the like are provided. The Heusler alloy has high spin polarizability.

The stacked body 10 may include an antiferromagnetic layer on the surface of the second ferromagnetic layer 2 opposite to the non-magnetic layer 3 via a spacer layer. The second ferromagnetic layer 2, the spacer layer, and the antiferromagnetic layer have a synthetic antiferromagnetic structure (SAF structure). The synthetic antiferromagnetic structure includes two magnetic layers sandwiching the non-magnetic layer. The antiferromagnetic coupling between the second ferromagnetic layer 2 and the antiferromagnetic layer increases the coercive force of the second ferromagnetic layer 2 as compared with a case without the antiferromagnetic layer. The antiferromagnetic layer is, for example, IrMn, PtMn, or the like. The spacer layer contains, for example, at least one selected from the group consisting of Ru, Ir, and Rh.

The stacked body 10 may include a layer other than the first ferromagnetic layer 1, the second ferromagnetic layer 2, and the non-magnetic layer 3. For example, a base layer may be provided between the wiring 20 and the stacked body 10. The base layer enhances the crystallinity of each layer constituting the stacked body 10.

The wiring 20 is in contact with, for example, one surface of the stacked body 10. The wiring 20 is the write wiring for writing data to the magnetoresistance effect element 100. The wiring 20 extends in the x-direction. At least a portion of the wiring sandwiches the first ferromagnetic layer 1 together with the non-magnetic layer 3 in the z-direction. The area of a first surface 20a of the wiring 20 far from the substrate Sub is, for example, smaller than the area of the second surface 20b opposite to the first surface 20a. For example, the peripheral length of the wiring 20 increases from the first surface 20a toward the second surface 20b.

The wiring 20 generates a spin current by the spin Hall effect when a current I flows, and injects spin into the first ferromagnetic layer 1. The wiring 20 gives, for example, spin-orbit torque (SOT) sufficient to reverse the magnetization of the first ferromagnetic layer 1, to the magnetization of the first ferromagnetic layer 1. The spin Hall effect is a phenomenon in which a spin current is induced in a direction perpendicular to a direction in which a current flows, based on the spin-orbit interaction when a current is passed. The spin Hall effect is common to the normal Hall effect in that the moving charge (electron) can bend the moving direction. In the normal Hall effect, the moving direction of charged particles moving in a magnetic field can be bent by the Lorentz force. On the other hand, in the spin Hall effect, even though a magnetic field is not provided, the moving direction of spin can be bent only by the movement of electrons (only the flow of a current).

For example, when a current flows through the wiring 20, first spin oriented in one direction and second spin oriented in a direction opposite to the first spin may be bent in a direction perpendicular to the direction in which the current I flows, by the spin Hall effect. For example, the first spin oriented in the −y direction may be bent in the +z direction, and the second spin oriented in the +y direction may be bent in the −z direction.

In a non-magnetic material (a material that is not a ferromagnetic material), the number of electrons in the first spin generated by the spin Hall effect is equal to the number of electrons in the second spin. That is, the number of electrons in the first spin in the +z direction is equal to the number of electrons in the second spin in the −z direction. The first spin and the second spin flows in a direction of eliminating the uneven distribution of the spin. In the movement of the first spin and the second spin in the z-direction, the charge flows cancel each other out, so that the amount of the current becomes zero. The spin current without the current may be especially referred to as a pure spin current.

When the electron flow in the first spin is represented by $J_\uparrow$, the electron flow in the second spin is represented by $J_\downarrow$, and the spin current is represented by $J_S$, the definition of $J_S=J_\uparrow-J_\downarrow$ is obtained. The spin current $J_S$ is generated in the z-direction. The first spin is injected from the wiring 20 into the first ferromagnetic layer 1.

The wiring 20 contains any of metal, an alloy, an intermetallic compound, a metal boride, a metal carbide, a metal silicide, and a metal phosphate having a function of generating a spin current by the spin Hall effect when a current I flows.

The wiring 20 contains, for example, non-magnetic heavy metal as a main element. The main element is an element having the highest proportion among the elements forming the wiring 20. The wiring 20 contains at least one selected from the group consisting of W, Ta, Pt, Mo, Ir, Zr, Re, Y, Os, Ru, Rh, Pd, and Mn, for example. Since the elements have d-electrons or f-electrons in the outermost shell, the spin-orbit interaction occurs strongly, and the amount of spin injected into the first ferromagnetic layer 1 increases.

The wiring 20 may contain magnetic metal. The magnetic metal is ferromagnetic metal or antiferromagnetic metal. A small amount of magnetic metal contained in the non-magnetic material becomes a scattering factor for spin. The small amount is, for example, 3% or less of the total molar ratio of the elements forming the wiring 20. When the spins are scattered by the magnetic metal, the spin-orbit interaction is enhanced and the efficiency of producing the spin current with respect to the current is increased.

The wiring 20 may include a topological insulator. A topological insulator is a substance in which the inside of the substance is an insulator or a high resistance substance, but the surface of the substance has a metallic state in which spin polarization occurs. In the topological insulator, an internal magnetic field is generated by the spin-orbit interaction. The topological insulator develops a new topological phase due to the effect of the spin-orbit interaction even though an external magnetic field is not provided. The topological insulator can generate the pure spin current with high efficiency due to the strong spin-orbit interaction and breaking of inversion symmetry at the edges.

As the topological insulator, for example, SnTe, $Bi_{1.5}Sb_{0.5}Te_{1.7}Se_{1.3}$, $TlBiSe_2$, $Bi_2Te_3$, $Bi_{1-x}Sb_x$, $(Bi_{1-x}Sb_x)_2Te_3$, and the like are provided. The topological insulator can generate spin currents with high efficiency.

The first conductive portion 30 and the second conductive portion 40 sandwich the stacked body 10 in the x-direction in a plan view from the z-direction. The first conductive portion 30 and the second conductive portion 40 are wirings that connect the magnetoresistance effect element 100 and the transistor Tr. The first conductive portion and the second conductive portion 40 electrically connect, for example, elements and wirings in different layers.

The first conductive portion 30 and the second conductive portion 40 are made of a material having excellent conductivity. The first conductive portion 30 and the second conductive portion 40 contain, for example, any one selected from the group consisting of Ag, Cu, Co, Al, and Au.

The magnetoresistance effect element 100 is formed by a stacking step of each layer and a processing step of processing a portion of each layer into a predetermined shape. For stacking of each layer, a sputtering method, a chemical vapor deposition (CVD) method, an electron beam vapor deposition method (EB vapor deposition method), an atomic laser deposit method, or the like can be used. Processing of each layer can be performed by using photolithography or the like.

First, impurities are doped at predetermined positions on a substrate Sub to form a source S and a drain D. Then, a gate insulating film GI and a gate electrode G are formed between the source S and the drain D. The source S, the drain D, the gate insulating film GI, and the gate electrode G form a transistor Tr.

Then, an insulating layer 91 is formed to cover the transistor Tr. Further, a first conductive portion 30, a second conductive portion 40, and a conductive portion Cw are formed by forming an opening in the insulating layer 91 and filling the opening with a conductor. A write wiring Wp and a common wiring Cm are formed by stacking the insulating layer 91 to a predetermined thickness, and then forming a groove in the insulating layer 91, and filling the groove with a conductor.

Then, a wiring layer, a ferromagnetic layer, a non-magnetic layer, and a ferromagnetic layer are stacked in order on the surfaces of the insulating layer 91, the first conductive portion 30, and the second conductive portion 40. Then, the wiring layer is processed into a predetermined shape. A wiring 20 is obtained by processing the wiring layer into the predetermined shape. Then, the magnetoresistance effect element 100 can be manufactured by processing the stacked body formed on the wiring layer into the predetermined shape to form a stacked body 10.

Next, the operation of the magnetoresistance effect element 100 according to the first embodiment will be described. The magnetoresistance effect element 100 has a data write operation and a data read operation.

First, the operation of recording data on the magnetoresistance effect element 100 will be described. First, the first switching element 110 and the second switching element 120 joined to the magnetoresistance effect element 100 in which data is intended to be recorded are turned ON. When the first switching element 110 and the second switching element 120 are turned on, a write current flows through the wiring 20 between the write wirings $Wp_1$ to $Wp_n$ and the common wirings $Cm_1$ to $Cm_n$. When the write current flows through the wiring 20, the spin Hall effect occurs, and spin is injected into the first ferromagnetic layer 1. The spin injected into the first ferromagnetic layer 1 adds spin-orbit torque (SOT) to the magnetization of the first ferromagnetic layer 1 to change the orientation direction of the magnetization of the first ferromagnetic layer 1. When the current flow direction is reversed, the orientation of the spin injected into the first ferromagnetic layer 1 is reversed. Thus, it is possible to freely control the orientation direction of the magnetization.

The resistance value of the stacked body 10 in the stacking direction is small when the magnetization of the first ferromagnetic layer 1 and the magnetization of the second ferromagnetic layer 2 are parallel, and is large when the magnetization of the first ferromagnetic layer 1 and the magnetization of the second ferromagnetic layer 2 are antiparallel. Data is recorded in the magnetoresistance effect element 100 as the resistance value of the stacked body 10 in the stacking direction.

Next, an operation of reading data from the magnetoresistance effect element 100 will be described. First, the first switching element 110 or the second switching element 120 joined to the magnetoresistance effect element 100 in which data is intended to be recorded, and the third switching element 130 are turned ON. When each switching element is set in this manner, a read current flows in the stacking direction of the stacked body 10 between the common wirings $Cm_1$ to $Cm_n$ and the read wirings $Rp_1$ to $Rp_n$. When the resistance value of the stacked body 10 in the stacking direction changes according to the Ohm's law, the voltage to be output changes. Therefore, data recorded in the magnetoresistance effect element 100 can be read out, for example, by reading the voltage in the stacking direction of the stacked body 10.

In the magnetic recording array 200 according to the first embodiment, when the electrical resistances of the common wirings $Cm_1$ to $Cm_n$ are low, the common wirings $Cm_1$ to $Cm_n$ are less likely to cause electromigration (EM) and are less likely to deteriorate. In general, the common wirings $Cm_1$ to $Cm_n$ are used for both writing and reading in both the write operation and the read operation of the spin element. Thus, the common wirings $Cm_1$ to $Cm_n$ tend to generally more deteriorate than the write wirings $Wp_1$ to $Wp_n$ and the read wirings $Rp_1$ to $Rp_n$. In the magnetic recording array 200 in the first embodiment, the reason why electromigration (EM) of the common wirings $Cm_1$ to $Cm_n$ is less likely to occur is that the probability of an occurrence of voids, which is one factor in which EM is generated, is reduced. Void formation occurs when ions move, and a force acting on the ions is defined by the Hungtington model. From this model, it can be seen that, when the write current is constant, it is possible to reduce the force acting on the ions by lowering the electrical resistance, and it is possible to reduce the void generation probability. Such a tendency is similarly applied when the cross-sectional areas of the common wirings $Cm_1$ to $Cm_n$ with respect to the current application direction is large and when the electrical resistivity is low.

In the magnetic recording array 200 according to the first embodiment, when the electrical resistances of the common wirings $Cm_1$ to $Cm_n$ are lower than the electrical resistances of the write wirings $Wp_1$ to $Wp_n$ and the read wirings $Rp_1$ to $Rp_n$, and the electrical resistances of the write wirings $Wp_1$ to $Wp_n$ are lower than the electrical resistances of the read wirings $Rp_1$ to $Rp_n$, the common wirings $Cm_1$ to $Cm_n$ are less likely to deteriorate with more reliability. Further, since the electrical resistances of the write wirings $Wp_1$ to $Wp_n$ having an amount of current larger than the read wirings $Rp_1$ to $Rp_n$ are low, the write wirings $Wp_1$ to $Wp_n$ are less likely to deteriorate, so that the magnetic recording array 200 has a longer lifespan. Such tendency is similarly applied when the cross-sectional areas of the write wirings $Wp_1$ to $Wp_n$ with respect to the current application direction are larger than the cross-sectional areas of the read wirings $Rp_1$ to $Rp_n$, and when the electrical resistivities of the write wirings $Wp_1$ to $Wp_n$ are lower than the electrical resistivities of the read wirings $Rp_1$ to $Rp_n$.

Further, in the magnetic recording array 200 according to the first embodiment, the common wirings $Cm_1$ to $Cm_n$ have an electrical resistance lower than the electrical resistances of the write wirings $Wp_1$ to $Wp_n$ and the read wirings $Rp_1$ to $Rp_n$, and the read wirings $Rp_1$ to $Rp_n$ have an electrical resistance lower than the electrical resistances of the write wirings $Wp_1$ to $Wp_n$, the common wirings $Cm_1$ to $Cm_n$ are less likely to deteriorate with more reliability. Further, since the electrical resistances of the read wirings $Rp_1$ to $Rp_n$ are low, the MR ratio of the magnetoresistance effect element 100 is further increased. Such tendency is similarly applied when the cross-sectional areas of the read wirings $Rp_1$ to $Rp_n$ with respect to the current application direction are larger than the cross-sectional areas of the write wirings $Wp_1$ to $Wp_n$, and when the electrical resistivity of the read wiring is lower than the electrical resistivities of the write wirings $Wp_1$ to $Wp_n$.

In the magnetic recording array 200 according to the first embodiment, when the activation energies of the common wirings $Cm_1$ to $Cm_n$, are high, the common wirings $Cm_1$ to $Cm_n$ are less likely to deteriorate. In general, it is known that the wiring lifespan is obtained from the Black's empirical formula. From this empirical formula, it can be seen that the lifespans of the common wirings $Cm_1$ to $Cm_n$ are extended by selecting a material having a large active energy as the material of the common wirings $Cm_1$ to $Cm_n$. In the magnetic recording array 200 according to the first embodiment, the common wirings $Cm_1$ to $Cm_n$ contain a material having an activation energy of 300 kJ/mol or more, so that the lifespan is more reliably increased. Further, the common wirings $Cm_1$ to $Cm_n$ contain at least one metal selected from the group consisting of Si, Ti, Cr, Ta, W, and Ir, so that the lifespan is further reliably increased.

Second Embodiment

Figure 6:
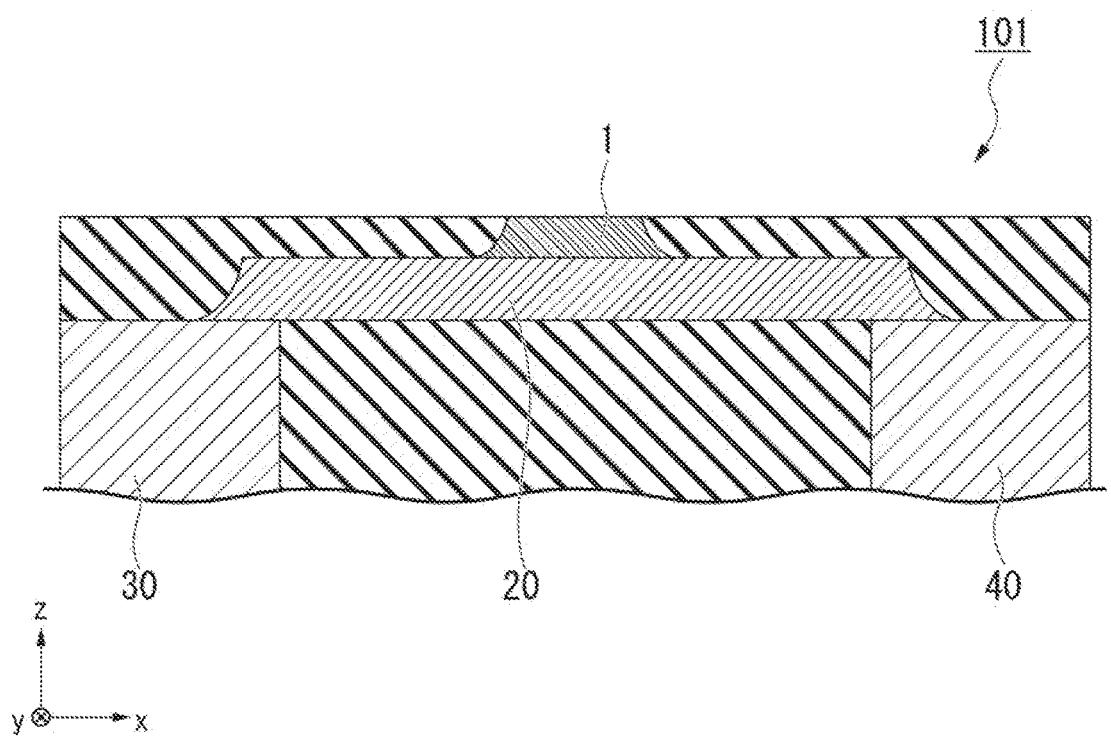
FIG. 6 is a cross-sectional view of a spin element according to a second embodiment.

FIG. 6 is a cross-sectional view of a magnetization rotating element 101 according to a second embodiment. FIG. 6 represents a cross section obtained by cutting the magnetization rotating element 101 along the xz plane passing through the center of the width of the wiring 20 in the y-direction. The magnetization rotating element 101 according to the second embodiment is different from the magnetoresistance effect element 100 according to the first embodiment in that the magnetization rotating element 101 does not include the non-magnetic layer 3 and the second ferromagnetic layer 2. Other components are similar to those of the magnetoresistance effect element 100 according to the first embodiment, and the description thereof will be omitted.

The magnetization rotating element 101 is an example of the spin element. For example, the magnetization rotating element 101 evaluates light that is incident on the first ferromagnetic layer 1 and then is reflected by the first ferromagnetic layer 1. When the orientation direction of magnetization changes due to the magnetic Kerr effect, the deflection state of the reflected light changes. The magnetization rotating element 101 can be used, for example, as an optical element using the difference in the deflection state of light, such as an image display device.

In addition, the magnetization rotating element 101 can be used singly as an anisotropic magnetic sensor, an optical element using the magnetic Faraday effect, and the like.

The magnetization rotating element 101 according to the second embodiment can obtain the similar effects to those of the magnetoresistance effect element 100 according to the first embodiment, only by removing the non-magnetic layer 3 and the second ferromagnetic layer 2. Further, a modification example similar to that of the magnetoresistance effect element 100 according to the first embodiment can be selected.

Third Embodiment

Figure 7:
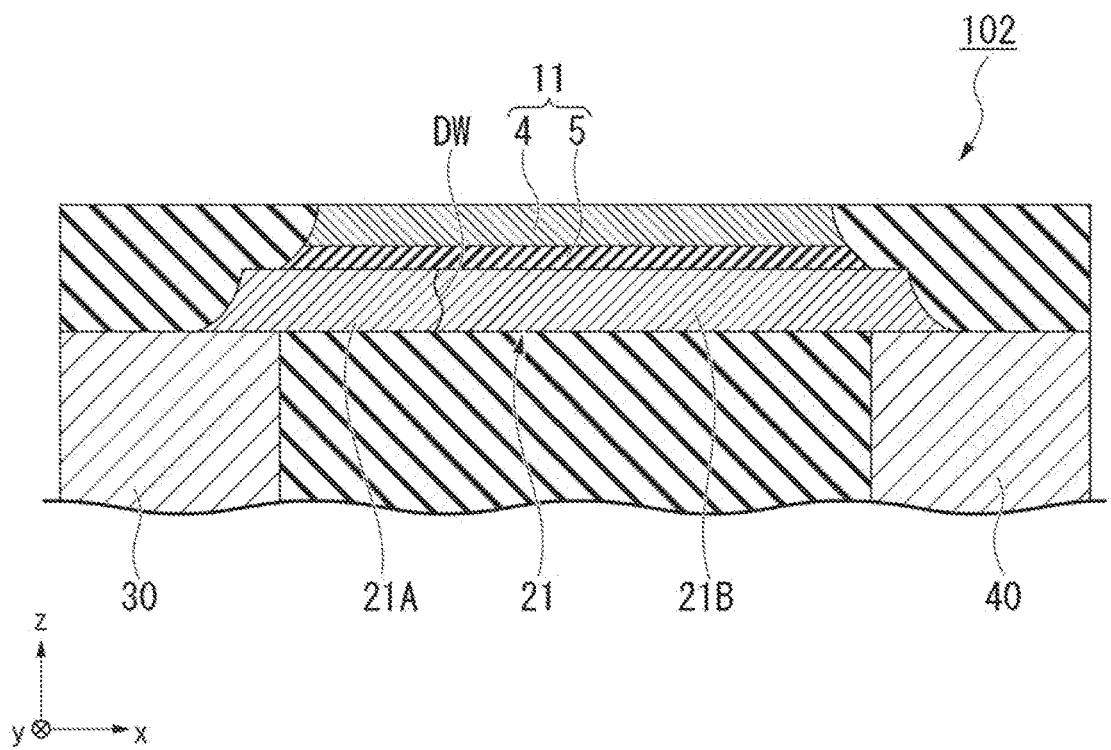
FIG. 7 is a cross-sectional view of a spin element according to a third embodiment.

FIG. 7 is a cross-sectional view of a magnetoresistance effect element 102 according to a third embodiment. FIG. 7 represents a cross section obtained by cutting the magnetoresistance effect element 102 along the xz plane passing through the center of the width of a wiring 21 in the y-direction. The magnetoresistance effect element 102 is different from the magnetoresistance effect element 100 in that a stacked body 11 is configured by a non-magnetic layer 5 and a first ferromagnetic layer 4 from the side closer to the wiring 21. Components similar to those of the magnetoresistance effect element 100 are denoted by the similar reference signs, and a description thereof will be omitted.

The magnetoresistance effect element 102 includes the stacked body 11, the wiring 21, the first conductive portion 30, and the second conductive portion 40. The stacked body 11 is configured by the non-magnetic layer 5 and the first ferromagnetic layer 4 from the side closer to the wiring 21. The magnetoresistance effect element 102 is an element having a resistance value that changes due to the movement of a domain wall DW, and may be referred to as a domain wall moving element or a domain wall moving type magnetoresistance effect element.

The wiring 21 is a magnetic layer. The wiring 21 contains a ferromagnetic material. For example, as the magnetic material forming the wiring 21, metal selected from the group consisting of Cr, Mn, Co, Fe, and Ni, an alloy including one or more of the above kinds of metal, an alloy including the above kinds of metal and an element of at least one or more kinds of B, C, and N, and the like can be used. Specifically, Co—Fe, Co—Fe—B, and Ni—Fe are exemplary examples.

The wiring 21 is a layer capable of magnetically recording information by changing the internal magnetic state. The wiring 21 has a first magnetic domain 21A and a second magnetic domain 21B inside. The magnetization of the first magnetic domain 21A and the magnetization of the second magnetic domain 21B are oriented in opposite directions, for example. The boundary between the first magnetic domain 21A and the second magnetic domain 21B is a domain wall DW. The wiring 21 can have the domain wall DW inside.

The magnetoresistance effect element 102 can record data in multiple values or continuously depending on the position of the domain wall DW of the wiring 21. The data recorded in the wiring 21 is read out as a change in the resistance value of the magnetoresistance effect element 102, when a read current is applied.

The domain wall DW moves by a write current passing in the x-direction of the wiring 21 or by applying an external magnetic field. For example, when the write current (for example, a current pulse) is applied in the +x direction of the wiring 21, electrons flow in the −x direction opposite to the current. Thus, the domain wall DW moves in the −x direction. When a current flows from the first magnetic domain 21A to the second magnetic domain 21B, the spin-polarized electrons in the second magnetic domain 21B reverse the magnetization of the first magnetic domain 21A. The domain wall DW moves in the −x direction by reversing the magnetization of the first magnetic domain 21A.

Each of the first ferromagnetic layer 4 and the non-magnetic layer 5 is similar to the first ferromagnetic layer 1 and the non-magnetic layer 3 according to the first embodiment.

The magnetoresistance effect element 102 according to the third embodiment can also obtain the similar effects to those of the magnetoresistance effect element 100 according to the first embodiment. Further, a modification example similar to that of the magnetoresistance effect element 100 according to the first embodiment can be selected.

Fourth Embodiment

Figure 8:
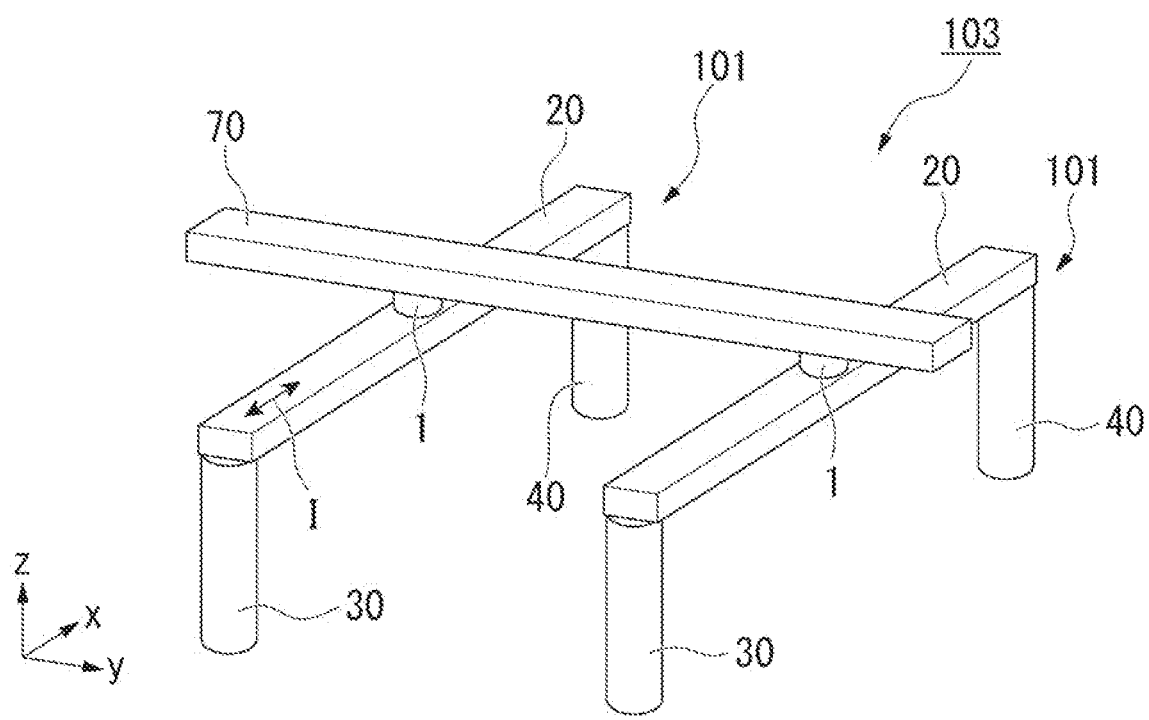
FIG. 8 is a perspective view of a reservoir element according to a fourth embodiment.

FIG. 8 is a perspective view of a reservoir element 103 according to a fourth embodiment. The reservoir element 103 includes a plurality of magnetization rotating elements 101 and a spin conduction layer 70 that connects the first ferromagnetic layers 1 of the plurality of magnetization rotating elements 101. The spin conduction layer 70 is made of, for example, a non-magnetic conductor. The spin conduction layer 70 propagates the spin current exuded from the first ferromagnetic layer 1.

The reservoir element is an element used in a reservoir computer, which is one of neuromorphic elements. The neuromorphic element is an element that imitates the human brain by a neural network. The neuromorphic element is used, for example, as a recognition machine. The recognition machine recognizes (image recognition) and classifies the input image, for example.

The reservoir element 103 converts the input signal into another signal. In the reservoir element 103, the signals only interact with each other and are not learned. When the input signals interact with each other, the input signals change non-linearly. That is, the input signal is replaced with another signal while retaining the original information. The input signals change with the passage of time by interacting with each other in the reservoir element 103. In the reservoir element 103, the first ferromagnetic layers 1 corresponding to a plurality of neurons are connected to each other. Therefore, for example, a signal output from a neuron at a certain time point t may be brought back to the original neuron at a certain time point (t+1). In the neurons, processing can be performed based on the signals at the time point t and the time point (t+1), and information can be processed recursively.

The spin conduction layer 70 is, for example, metal or a semiconductor. As the metal used for the spin conduction layer 70, for example, metal or an alloy containing any element selected from the group consisting of Cu, Ag, Al, Mg, and Zn is provided. The semiconductor used for the spin conduction layer 70 is, for example, a simple substance or an alloy of any element selected from the group consisting of Si, Ge, GaAs, and C. Si, Ge, Si—Ge compound, GaAs, graphene, and the like are exemplary examples.

When the current I flows through the wiring 20, spin is injected into the first ferromagnetic layer 1, and spin-orbit torque is applied to the magnetization of the first ferromagnetic layer 1. When a radio-frequency current is applied to the wiring 20, the orientation of the spin injected into the first ferromagnetic layer 1 changes, and the magnetization of the first ferromagnetic layer 1 vibrates.

The spin current reaches the spin conduction layer 70 from the first ferromagnetic layer 1. Since the magnetization of the first ferromagnetic layer 1 is vibrating, the spin current flowing through the spin conduction layer 70 also vibrates in response to the magnetization. The spins accumulated at the interface between the first ferromagnetic layer 1 and the spin conduction layer 70 propagate in the spin conduction layer 70 as the spin current.

The spin currents produced by the magnetizations of the two first ferromagnetic layers 1 merge and interfere with each other in the spin conduction layer 70. The interference of the spin current has an influence on the vibration of the magnetization of each first ferromagnetic layer 1, and the vibrations of the magnetizations of the two first ferromagnetic layers 1 resonate. The phases of the vibrations of the two magnetizations are synchronized or shifted by the half of a wavelength ($\pi$).

When the application of the current I to the wiring 20 is stopped, the vibration of the magnetization of the first ferromagnetic layer 1 is stopped. The magnetization of the first ferromagnetic layer 1 after the resonance becomes parallel or antiparallel. When the phases of the two vibrations are synchronized, the orientations of the two magnetizations are aligned in parallel. When the phases of the two vibrations are shifted by the half of the wavelength ($\pi$), the orientations of the two magnetizations are opposite and antiparallel.

When the magnetizations of the two first ferromagnetic layers 1 are parallel, the resistance value of the reservoir element 103 is smaller than the resistance value when the magnetizations are antiparallel. For example, the reservoir element 103 outputs "1" when the resistance value of the reservoir element 103 is large (when two magnetizations are antiparallel) and outputs "0" when the resistance value is small (when the two magnetizations are parallel).

The current I input to the wiring 20 has various types of information. For example, the current I has the frequency of the current I, the current density, the amount of current, and the like. The reservoir element 103 outputs information of "1" and "0" as the resistance values. That is, the reservoir element 103 according to the Fourth embodiment converts information by converting the vibrations of the magnetizations of the plurality of first ferromagnetic layers 1 into spin currents and causing the spin currents to interfere with each other in the spin conduction layer 70.

The reservoir element 103 according to the fourth embodiment includes the magnetic recording array 200 according to the first embodiment, and can obtain similar effects to those in the first embodiment.

Hitherto, the preferred embodiment of the present invention has been exemplified in the first to fourth embodiments, but the present invention is not limited to the embodiments.

For example, the characteristic configuration in each embodiment may be applied to other embodiments.

In the magnetic recording array 200 in the present Embodiment, the write wirings $Wp_1$ to $Wp_n$ and the read wirings $Rp_1$ to $Rp_n$ extend in the same direction, and the common wirings $Cm_1$ to $Cm_n$ extend in the direction perpendicular to the direction in which the write wirings $Wp_1$ to $Wp_n$ and the read wirings $Rp_1$ to $Rp_n$ extend, but the direction of each wiring is not limited to this. For example, a configuration in which the write wirings $Wp_1$ to $Wp_n$ extend in one direction, the read wirings $Rp_1$ to $Rp_n$ extend in a direction different from the one direction, and the common wirings $Cm_1$ to $Cm_n$ extend in a direction different from the extension direction of the write wirings $Wp_1$ to $Wp_n$ and the extension direction of the read wirings $Rp_1$ to $Rp_n$, may be made. In this case, it is preferable that the write wirings $Wp_1$ to $Wp_n$ extend in the x-direction and the read wirings $Rp_1$ to $Rp_n$ extend in the y-direction.

REFERENCE SIGNS LIST 1, 4: First ferromagnetic layer
2: Second ferromagnetic layer
3, 5: Non-magnetic layer
10, 11: Stacked body
20, 21: Wiring
20a: First surface
20b: Second surface
21A: First magnetic domain
21B: Second magnetic domain
30: First conductive portion
40: Second conductive portion
70: Spin conduction layer
90, 91, 92: Insulating layer
100, 102: Magnetoresistance effect element
101: magnetization rotating element
103: Reservoir element
110: First switching element
120: Second switching element
130: Third switching element
140: Switching element
200, 201: Magnetic recording array
C1, C2, C3, C4: Center
$Cm_1$ to $Cm_n$: Common wiring
Cw: Conductive portion
D: Drain
E: Conductive layer
G: Gate electrode
GI: Gate insulating film
$Rp_1$ to $Rp_n$: Read wiring
S: Source
Sub: Substrate
Tr: Transistor
$Wp_1$ to $Wp_n$: Write wiring

The invention claimed is:

1. A magnetic recording array comprising:
a plurality of spin elements arranged in a matrix, each spin element including a wiring and a stacked body that includes a first ferromagnetic layer stacked on the wiring;
a plurality of write wirings connected to first ends of the respective wirings in the plurality of spin elements;
a plurality of read wirings connected to the respective stacked bodies in the plurality of spin elements; and
a plurality of common wirings connected to second ends of the wirings in the respective spin elements belonging to the same column,
wherein the common wiring has an electrical resistance lower than an electrical resistance of the write wiring or the read wiring.

2. The magnetic recording array according to claim 1, wherein
the common wiring has the electrical resistance lower than the electrical resistances of the write wiring and the read wiring, and
the write wiring has the electrical resistance lower than the electrical resistance of the read wiring.

3. The magnetic recording array according to claim 1, wherein
the common wiring has the electrical resistance lower than the electrical resistances of the write wiring and the read wiring, and
the read wiring has the electrical resistance lower than the electrical resistance of the write wiring.

4. The magnetic recording array according to claim 1, wherein
a cross-sectional area of the common wiring with respect to a current application direction is larger than a cross-sectional area of the write wiring or the read wiring with respect to a current application direction.

5. The magnetic recording array according to claim 4, wherein
the cross-sectional area of the common wiring with respect to the current application direction is larger than the cross-sectional areas of the write wiring and the read wiring with respect to the current application direction, and
the cross-sectional area of the write wiring with respect to the current application direction is larger than the cross-sectional area of the read wiring with respect to the current application direction.

6. The magnetic recording array according to claim 4, wherein
the cross-sectional area of the common wiring with respect to the current application direction is larger than the cross-sectional areas of the write wiring and the read wiring with respect to the current application direction, and
the cross-sectional area of the read wiring with respect to the current application direction is larger than the cross-sectional area of the write wiring with respect to the current application direction.

7. The magnetic recording array according to claim 1, wherein
the common wiring has an electrical resistivity lower than an electrical resistivity of the write wiring or the read wiring.

8. The magnetic recording array according to claim 7, wherein
the common wiring has the electrical resistivity lower than the electrical resistivities of the write wiring and the read wiring, and
the write wiring has the electrical resistivity lower than the electrical resistivity of the read wiring.

9. The magnetic recording array according to claim 7, wherein
the common wiring has the electrical resistivity lower than the electrical resistivities of the write wiring and the read wiring, and
the read wiring has the electrical resistivity lower than the electrical resistivity of the write wiring.

10. The magnetic recording array according to claim 1, wherein
the wiring of the spin element is connected to the common wiring via a control element.

11. The magnetic recording array according to claim 1, wherein
the wiring is made of any one of the group consisting of metal, an alloy, an intermetallic compound, a metal boride, a metal carbide, a metal silicide, and a metal phosphate having a function of generating a spin current by a spin Hall effect when a current flows.

12. The magnetic recording array according to claim 1, wherein
the stacked body includes a non-magnetic layer and the first ferromagnetic layer from a side close to the wiring, and
the wiring is a ferromagnetic layer enabled to have a domain wall inside.

13. A reservoir element comprising:
the magnetic recording array according to claim 1; and
a spin conduction layer that connects the first ferromagnetic layers of the plurality of spin elements to each other.

14. The magnetic recording array according to claim 1, wherein the plurality of common wirings have the electrical resistance lower than the electrical resistances of the plurality of write wirings and the plurality of common wirings have the electrical resistance lower than the electrical resistances of the plurality of read wirings.

* * * * *